Figure 1:
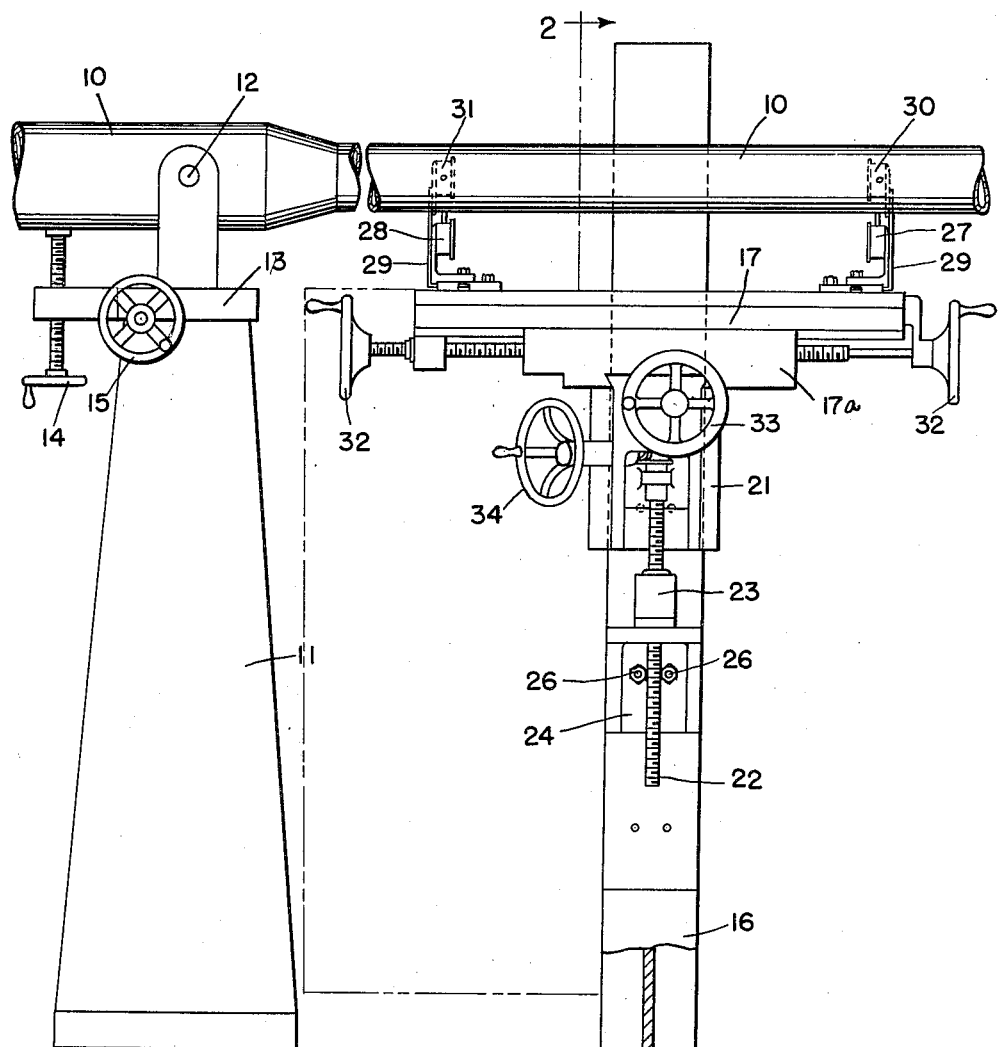

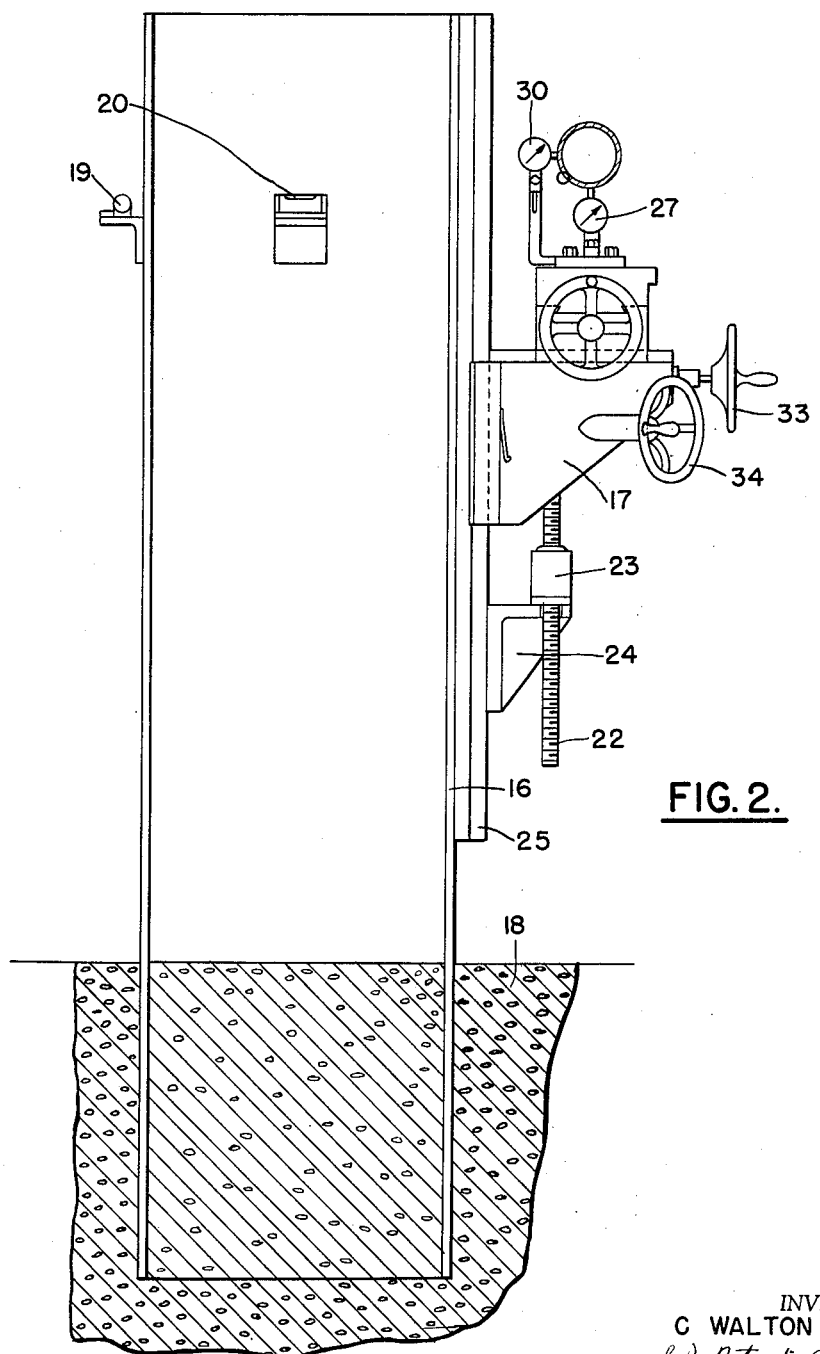

United States Patent Office 3,070,892
Patented Jan. 1, 1963

3,070,892
MICROMETRIC RIFLE ALIGNER
C Walton Musser, Beverly, Mass., assignor to the United States of America as represented by the Secretary of the Army
Filed Feb. 1, 1960, Ser. No. 6,077
3 Claims. (Cl. 33—180)
(Granted under Title 35, U.S. Code (1952), sec. 266)

The invention described herein may be manufactured and used by or for the Government for governmental purposes without the payment to me of any royalty thereon.

This invention relates to means whereby a gun may be more nearly accurately directed toward a target for firing successive rounds than has been done heretofore. An object is to provide an apparatus of the above type which is adapted for the testing of ammunition.

In order that variations in ammunition and its propelling charge may be analyzed, exact pointing of a gun for each firing must be made yet such a goal has long been desired but not realized.

According to this invention separate supports for a gun and sensitive gauges are provided in order that the gun may be positioned at multiple points to within less than a ten thousandth of an inch of the position (in both azimuth and elevation) it was in for a previous firing. This then, provides a means of accurately positioning or aiming a gun barrel in space.

Referring to the drawing,

FIG. 1 shows a side elevation of one embodiment of this invention as seen from the flank of a gun, and FIG. 2 is a sectional view on the line 2—2 of FIG. 1.

As shown in the drawing, a gun 10 is provided with a usual mount or support 11 including a pair of trunnions 12 by means of which the gun may be adjusted in elevation with the aid of any conventional means for doing so, such as the handwheel 14 and gearing connected therewith. Also, the gun is provided with mechanism by means of which it may be traversed for adjustment in azimuth such as by the handwheel 15 and the usual connected gearing, by means of which the base ring 13 is angularly adjustable.

An upstanding column or support 16 is of I shape in cross section anchored in concrete independently of the gun support 11. Carried by the table 17 and longitudinally adjustably mounted on the column 16 are spaced pairs of sensitive dial indicating gauges by means of which the accurate position of the gun may be determined. Levels 19 and 20 having at least about a 10 second accuracy are mounted on the column 16 at a right angle to one another to assist in the column being positioned vertically in the concrete 18 and to permit rechecking periodically whether position has been maintained.

The table 17, saddle 17a, knee 21 and their adjustments are standard milling machine parts. For raising and lowering the table, saddle, and knee, a supporting bracket 24 takes the weight of those parts through a housing 23 for an elevating screw 22. A guide plate 25 is secured to the column and bracket 24 is secured by bolts 26 to the guide plate 25 and column 16.

The spaced pairs of dial indicators include those engaging the underside of the gun barrel, i.e., dial gauge 27 at a forward position, dial 28 also for engaging a rear part of the gun on the underside a distance behind dial gauge 27, and the dial indicators 30 and 31 for contact with side of the gun barrel adjacent the first two. The gauges are of the sort graduated to read to .0001 of an inch with still smaller readings possible between graduations. Brackets 29 adjustably support these gauges from table 17 and stops, not shown, for the dial spindles protect the gauges from injury. With the dial indicators 27 and 30 placed 33⅓ inches from indicators 28 and 31, a difference in reading between the front and rear dial indicators may be read as hundredths of a mil by multiplying the difference in thousandths of an inch by three. One graduation then equals .003 of a mil.

Handwheels 32 control longitudinal movement of the table 17 with respect to the saddle 17a, i.e., adjustment of the table transversely as shown in FIG. 1. Adjustment into and from the plane of the paper is accomplished by handwheel 33 in FIG. 1 which in FIG. 2 is transversely. Vertical adjustment of the table, saddle and knee is accomplished by handwheel 34.

By proper adjustment of the dial indicators, making allowance for taper on the gun barrel, the difference between the front and rear dial indicators would accurately show the angle at which the gun was placed in reference to an original determination that may have been made by many firings or by optical means. A bar, not shown, could be clamped to guide plate 25 to serve as a master reference for setting the dial indicators. In use, the dial indicators should be moved away from contact with the gun for firing in order that shocks may not damage them. After resetting the gun to approximately its former position dial gauges 27 and 28 are moved by adjustment 34 up into contact with the gun and indicators are moved transversely in FIG. 2 by handwheel 33 to engage the gun.

A chief advantage of this invention is the availability of means whereby the gun may be given its former position for refiring at the identical readings of the dial indicators. If the table were elevated so that the rear dial indicator 28 read zero, the forward dial indicator 27 in thousandths of an inch (with the 33⅓ inch spacing) could be multiplied by three for showing the elevation of the gun in hundredths of a mil. In the drawing the indicators are all shown as being readable from an intermediate position, but if desired they may be placed so as to be substantially simultaneously readable from one position beyond the pairs of indicators. In the same way that dial indicators may be used to determine elevation accurately, the dial indicators 30 and 31 may also indicate the angular displacement in a horizontal plane from a reference line through the rear dial indicator 31.

I claim:

1. The combination with a gun, a mount for the gun, means whereby the gun may be adjusted in elevation, means whereby the gun may be adjusted in azimuth, of means for indicating when the gun is pointed in the same direction it had during firing a previous round, said last mentioned means including an upstanding support spaced from and independent of said mount, a pair of dial indicating gauges angularly spaced apart substantially 90° and carried by said support for contact with an outer surface of the gun, and a second pair of dial indicating gauges similarly spaced angularly for contact with an outer surface of said gun at a location longitudinally spaced from said first mentioned pair.

2. A combination according to claim 1 in which the support for said gauges includes a column set in concrete independent of the gun mount, and a pair of levels secured to said column at 90° to each other for indicating whether said column is upright.

3. A combination according to claim 2 in which a table is carried by said column, and said table is provided with means whereby it may be adjusted longitudinally and transversely of the gun as well as up and down said column, said pairs of gauges being carried by said table.

References Cited in the file of this patent

UNITED STATES PATENTS

| | | |
|---|---|---|
| 1,595,713 | Damerell | Aug. 10, 1926 |
| 1,667,995 | Steinle | May 1, 1928 |
| 2,531,317 | Baney | Nov. 21, 1950 |
| 2,630,633 | Webb | Mar. 10, 1953 |
| 2,641,056 | Eccleston | June 9, 1953 |
| 2,731,829 | Wigington | Jan. 24, 1956 |
| 2,858,615 | Aller | Nov. 4, 1958 |

FOREIGN PATENTS

| | | |
|---|---|---|
| 887,651 | France | Aug. 16, 1943 |